(12) United States Patent
Nilsson et al.

(10) Patent No.: US 8,844,352 B2
(45) Date of Patent: Sep. 30, 2014

(54) PULSED LEVEL GAUGE SYSTEM WITH ADAPTIVE TRANSCEIVER CONTROL

(75) Inventors: Leif Nilsson, Linkoping (SE); Hakan Nyberg, Linkoping (SE); Hakan Delin, Linkoping (SE)

(73) Assignee: Rosemount Tank Radar AB, Goteborg (SE)

( * ) Notice: Subject to any disclaimer, the term of this patent is extended or adjusted under 35 U.S.C. 154(b) by 309 days.

(21) Appl. No.: 13/525,607

(22) Filed: Jun. 18, 2012

(65) Prior Publication Data

US 2013/0333465 A1     Dec. 19, 2013

(51) Int. Cl.
*G01F 23/284*     (2006.01)

(52) U.S. Cl.
USPC ........................................... 73/293; 356/445

(58) Field of Classification Search
USPC ............. 73/293; 356/445, 606, 611, 614–624
See application file for complete search history.

(56) References Cited

U.S. PATENT DOCUMENTS

| | | | |
|---|---|---|---|
| 4,443,699 A * | 4/1984 | Keller | 73/293 |
| 6,014,100 A | 1/2000 | Fehrenbach et al. | |
| 7,131,325 B2 | 11/2006 | Nilsson et al. | |
| 8,030,633 B2 * | 10/2011 | Stoddard et al. | 73/293 |
| 8,629,983 B2 * | 1/2014 | Forcales et al. | 356/445 |
| 8,701,746 B2 * | 4/2014 | Rohr | 73/293 |
| 2006/0000275 A1 | 1/2006 | Nilsson et al. | |
| 2010/0039648 A1 * | 2/2010 | Garcia da Fonseca | 356/445 |
| 2010/0214091 A1 | 8/2010 | Thoren et al. | |
| 2010/0298999 A1 | 11/2010 | Allgaier et al. | |
| 2011/0140951 A1 | 6/2011 | Nyberg | |
| 2011/0229830 A1 * | 9/2011 | Bhattacharyya et al. | 356/445 |
| 2012/0140233 A1 * | 6/2012 | Rockwell et al. | 356/445 |
| 2013/0314711 A1 * | 11/2013 | Cantin et al. | 356/445 |

FOREIGN PATENT DOCUMENTS

| | | |
|---|---|---|
| DE | 10034875 A1 | 2/2002 |
| EP | 2116819 | 11/2009 |
| WO | 2008080754 A1 | 7/2008 |

OTHER PUBLICATIONS

European Search Report/Communication dated Sep. 5, 2013 for Appln. No. 13172360.3-1811.

* cited by examiner

*Primary Examiner* — G. Bradley Bennett
(74) *Attorney, Agent, or Firm* — Westman, Champlin & Koehler, P.A.

(57) ABSTRACT

The method comprises the steps of generating a transmission signal; propagating the transmission signal towards the product; receiving a reflected signal; providing a reference signal exhibiting a time-varying phase difference in relation to the transmission signal; forming a measurement signal; and determining the filling level based on the measurement signal. The method further comprises the steps of: determining a reduced time period comprising a time when the time-varying phase difference corresponds to an anticipated filling level, the reduced time period being shorter than the measurement sweep time period; controlling the level gauge system to change from a low-power state to a high-power state at a start of the reduced time period; and controlling the level gauge system to change back from the high-power state to the low-power state at an end of the reduced time period.

15 Claims, 3 Drawing Sheets

PULSED LEVEL GAUGE SYSTEM WITH ADAPTIVE TRANSCEIVER CONTROL

TECHNICAL FIELD OF THE INVENTION

The present invention relates to a pulsed level gauge system and to a method of determining a filling level of a product in a tank using a pulsed level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the frequency difference between a transmitted frequency-modulated signal and its reflection at the surface. The latter type of systems are generally referred to as being of the FMCW (Frequency Modulated Continuous Wave) type.

For pulsed radar level gauge systems, time expansion techniques are generally used to resolve the time-of-flight.

Such pulsed radar level gauge systems may have a first oscillator for generating a transmission signal formed by pulses for transmission towards the surface of the product contained in the tank with a transmitted pulse repetition frequency $f_t$, and a second oscillator for generating a reference signal formed by reference pulses with a reference pulse repetition frequency $f_{ref}$ that differs from the transmitted pulse repetition frequency by a given frequency difference $\Delta f$. This frequency difference $\Delta f$ is typically in the range of Hz or tens of Hz.

At the beginning of a measurement sweep, the transmission signal and the reference signal are usually synchronized to have the same phase. Due to the frequency difference $\Delta f$, the phase difference between the transmission signal and the reference signal will gradually increase during the measurement sweep.

During the measurement sweep, the reflection signal resulting from reflection of the transmission signal at the surface of the product contained in the tank is being correlated with the reference signal, so that an output signal is only produced when a reflected pulse and a reference pulse occur at the same time. The time from the start of the measurement sweep to the occurrence of the output signal resulting from the correlation of the reflection signal and the reference signal is a measure of the phase difference between the transmission signal and the reflection signal, which is in turn a time expanded measure of the time-of-flight of the reflected pulses, from which the distance to the surface of the product contained in the tank can be determined.

The full measurement sweep can correspond to a rather large measurement range (from a minimum measuring distance which is typically zero to a maximum measuring distance which may be quite large). Actually, the maximum measuring distance is usually far greater than the distance from the level gauge system to the bottom of the tank. Clearly, the energy (and time) used for performing the portion of the measurement sweep corresponding to the distance from the bottom of the tank to the maximum measuring distance does not directly contribute to providing a determination of the filling level.

US 2011/0140951 describes a level gauge system in which the two oscillators can be controlled to be in-phase without having to wait for the entire measurement sweep to be completed. Accordingly, the measurement sweep may be interrupted and restarted, so that no energy has to be wasted on running through the part of the measurement sweep, for example, corresponding to distances further away from the level gauge system than the bottom of the tank.

Although US 2011/0140951 provides for a considerable reduction in the energy consumption of a pulsed level gauge system, it would be desirable to provide for a further reduction in the energy consumption and/or to provide for a reduction in energy consumption of pulsed level gauge systems with other types of pulse generating circuitry than that described in US 2011/0140951.

SUMMARY

In view of the above, a general object of the present invention is to provide an improved pulsed level gauge system and method, and in particular a pulsed level gauge system and method enabling a more energy efficient filling level determination.

According to a first aspect of the present invention, there is provided a level gauge system, for determination of a filling level of a product contained in a tank using electromagnetic signals, the level gauge system comprising: transmission signal generating circuitry for generating an electromagnetic transmission signal in the form of a sequence of transmit pulses; a propagation device connected to the transmission signal generating circuitry and arranged to propagate the electromagnetic transmission signal towards a surface of the product inside the tank, and to return a reflected electromagnetic signal resulting from reflection of the electromagnetic transmission signal at the surface of the product contained in the tank; reference signal providing circuitry configured to provide an electromagnetic reference signal in the form of a sequence of reference pulses; timing circuitry connected to at least one of the transmission signal generating circuitry and the reference signal providing circuitry for providing a time-varying phase difference between the electromagnetic transmission signal and the electromagnetic reference signal, the time-varying phase difference varying between a phase difference corresponding to a minimum measurement distance and a phase difference corresponding to a maximum measurement distance during a measurement sweep time period; measurement circuitry connected to the propagation device and to the reference signal providing circuitry, the measurement circuitry being configured to provide a measurement signal based on the electromagnetic reference signal and the reflected electromagnetic signal; processing circuitry connected to the measurement circuitry for determining a filling level based on the measurement signal; and power management circuitry connected to at least one of the transmission signal generating circuitry and the reference signal providing circuitry, and configured to control at least one of the transmission signal generating circuitry and the reference signal providing circuitry to change from a low-power state to a high-power state at a start of a reduced time period comprising a time when the time-varying phase difference corresponds to an anticipated filling level and to change back from the high-power state to the low-power state at an end of the reduced time period, the reduced time period being shorter than the measurement sweep time period.

The tank may be any container or vessel capable of containing a product, and may be metallic, or partly or completely non-metallic, open, semi-open, or closed.

Furthermore, the filling level of the product contained in the tank may be determined directly by using a propagation device propagating the transmission signal towards the product inside the tank, or indirectly by using a propagation device disposed inside a so-called chamber located on the outside of the tank, but being in fluid connection with the inside of the tank in such a way that the level in the chamber corresponds to the level inside the tank.

The propagation device may be any device capable of propagating electromagnetic signals, including transmission line probes, waveguides and various types of radiating antennas such as horn antennas, parabolic antennas, rod antennas, array antennas etc.

The "timing circuitry" may be any circuitry capable of controlling a phase difference between the transmission signal and the reference signal. Accordingly, the timing circuitry may, for example, comprise frequency control circuitry for controlling a frequency difference between two pulse generators, and/or delay circuitry for controlling a delay of at least one of the transmission signal and the reference signal.

It should be noted that any one or several of the means comprised in the processing circuitry and/or the power management circuitry and/or the timing circuitry may be provided as either of a separate physical component, separate hardware blocks within a single component, or software executed by one or several microprocessors.

The present invention is based on the realization that the level gauge system in most cases only needs to be fully active during a short time period that includes a time when the time-varying phase difference between the transmission signal and the reference signal corresponds to an anticipated filling level.

There are applications where the filling level remains practically constant during long periods of time and/or only fluctuates slowly. For such applications, it will generally not be necessary to try to detect a reflected signal that would be indicative of a filling level that differs very much from the most recently determined filling level.

Hereby, energy can be saved, while maintaining a desired update rate. This means that for, for example, a battery powered level gauge system, the battery life can be prolonged without having to reduce the performance of the level gauge system in terms of update rate and/or measurement accuracy.

The reduced time period may advantageously be less than one half of the measurement sweep time period. This means that some parts of the level gauge system will be operating during the entire measurement sweep time period, while other parts may be operating in a low-power mode or be completely shut off except during the reduced time period, which may be considerably shorter than the measurement sweep period.

According to an example embodiment, the reduced time period may correspond to a measurement range which is smaller than, say, 25% of the total distance from the level gauge system to the bottom of the tank, which means that at least parts of the level gauge system may be operating in the low-power state during a considerably longer time than they are operating in the high-power state. This is particularly the case as the total distance from the level gauge system to the bottom of the tank may corresponds to only a small portion of the total measurement sweep time period.

It should be understood that the level gauge system uses more electric power in the high-power state than in the low-power state, so that a longer time in the low-power state results in a longer usage time for a level gauge system having a local power store of a given capacity. According to an exemplary embodiment, the level gauge system may comprise an amplifier arranged between the propagation device and the measurement circuitry for amplifying the received reflected electromagnetic signal. In the low-power state, this amplifier may be disabled, and in the high-power state, it may be enabled and function to amplify the received reflected electromagnetic signal. This will result in a reduction of the energy consumption of the level gauge system without any loss in performance.

According to various embodiments of the present invention, the reduced time period may be determined based on a previous filling level determination, preferably at least a most recent previous filling level determination, which means that the reduced time period is determined based on the best available information regarding the anticipated current filling level.

The reduced time period may advantageously further be determined based on a signal from an auxiliary system indicating a change in the filling level. One or several signals from auxiliary systems such as, for example, pumps, valves, pressure sensors, temperature sensors etc may be used to supplement a filling level having previously been determined using the level gauge system. This may enable the use of a shorter reduced time period without increasing the risk of "missing" the surface echo signal. Hereby, a further reduction in the energy consumption of the level gauge system can be achieved.

According to various embodiments, the reduced time period may be determined based on a plurality of previous filling level determinations. This may increase the precision in the determination of the reduced time period, since several previous filling level determinations may be used to reliably indicate an anticipated filling level with a high probability.

According to one embodiment, the reduced time period may be dynamically determined based on a variation among the plurality of previous filling level determinations. In this embodiment, the reduced time period may be set longer (corresponding to a greater distance range) if the previous filling level determinations indicate relatively large fluctuations and shorter (corresponding to a smaller distance range) if the previous filling level determinations indicate a relatively stable filling level in the tank.

Furthermore, the reduced time period may be dynamically determined based on a rate of change of the filling level given by a plurality of previous filling level determinations. For example, the reduced time period may be set longer for a higher rate of change and shorter for a smaller rate of change. In addition, or as an alternative, the reduced time period may be translated in view of the rate of change. If the rate of change is positive, the reduced time period may be moved to correspond to a higher filling level and if the rate of change is negative, the reduced time period may be moved to correspond to a lower filling level.

In addition to tracking an echo that has been assigned to be the surface echo resulting from reflection of the transmitted electromagnetic signal at the surface of the product, it may be desirable to track additional echoes, which may be disturbance echoes and/or surface echo candidates.

To that end, the power management circuitry may be configured to control at least one of the transmission signal generating circuitry and the reference signal providing circuitry to change from the low-power state to the high-power (or active) state at a start of at least one additional reduced time period comprising a time when the time-varying phase difference corresponds to a previously identified further echo signal and to change back to the low-power state at an end of the additional reduced time period.

According to various embodiments, the level gauge system may further be configured to periodically perform a measurement across a full measurement sweep, utilizing the entire measurement sweep time period. Hereby, it can periodically be verified that it is indeed the correct echo that has been assigned as the surface echo and that this echo occurs within the reduced time period.

Such a measurement across a full measurement sweep need not necessarily take place only periodically, but could also be performed in case a measurement taking place during the reduced time period does not fulfill a predefined condition. For example, a full measurement sweep may be performed if no echo signal having an amplitude higher than a predefined threshold is detected within the reduced time period.

The level gauge system may comprise several components and/or circuitry within components that can be changed to from a low-power state (such as an off-state) to a high-power state (also referred to as an active state, which may be an on-state) at the start of the reduced time period and changed back to the low-power state at the end of the reduced time period.

For example, one or both of the transmission signal generating circuitry and the reference signal providing circuitry may comprise at least one amplifier and/or at least one pulse generator and a microwave signal source arranged to be modulated by an output of the pulse generator.

For such embodiments of the level gauge system according to the present invention, the power management circuitry may advantageously be configured to provide control signals for enabling and disabling such amplifier(s) and/or such microwave signal source(s).

By "enabling" should be understood to change from a low-power state (such as a sleep state or an off state) to a high-power state (such as an on state). "Disabling" should, conversely, be understood to mean changing from the high-power state to the low-power state.

Moreover, the power management circuitry may further be connected to the measurement circuitry and configured to control the measurement circuitry to change from a low-power state to a high-power state at a start of the reduced time period comprising a time when the time-varying phase difference corresponds to a time-of-flight representing a previously determined filling level and to change back to the low-power state at an end of the reduced time period.

Controlling the measurement circuitry from the low-power state to the high-power state, and vice versa, may, for example, comprise controlling the power supplied to various components, such as a sample-and-hold amplifier and/or an analog-to-digital converter. This will result in a further reduction in the energy consumption of the level gauge system.

Furthermore, the level gauge system may advantageously further comprise a local energy store for providing electrical energy for operation of said level gauge system. The local energy store may, for example, comprise a battery and/or a super capacitor.

Moreover, the level gauge system may further comprise wireless communication circuitry, such as a radio transceiver, for wireless communication with a remote system.

According to a second aspect of the present invention, there is provided a method of determining a filling level of a product contained in a tank using electromagnetic signals, the method comprising the steps of: generating an electromagnetic transmission signal in the form of a sequence of transmit pulses; propagating the electromagnetic transmission signal towards a surface of the product contained in the tank; receiving a reflected electromagnetic signal resulting from reflection of the electromagnetic transmission signal at the surface of the product; providing an electromagnetic reference signal in the form of a sequence of reference pulses exhibiting a time-varying phase difference in relation to the transmission signal, the time-varying phase difference varying between a phase difference corresponding to a minimum measurement distance and a phase difference corresponding to a maximum measurement distance during a measurement sweep time period; forming a measurement signal based on the electromagnetic reference signal and the reflected electromagnetic signal; and determining the filling level based on the measurement signal, wherein the method further comprises the steps of: determining a reduced time period comprising a time when the time-varying phase difference corresponds to an anticipated filling level, the reduced time period being shorter than the measurement sweep time period; controlling the level gauge system to change from a low-power state to a high-power state at a start of the reduced time period; and controlling the level gauge system to change back from the high-power state to the low-power state at an end of the reduced time period.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS OF THE INVENTION

In the present detailed description, various embodiments of the level gauge system according to the present invention are mainly discussed with reference to a pulsed radar level gauge system of the non-contact type, in which an electromagnetic signal is propagated towards the product contained in the tank using a propagating device in the form of a radiating antenna, such as a cone antenna, a horn antenna, an array antenna or a patch antenna.

It should be noted that this by no means limits the scope of the present invention, which is equally applicable to a pulsed guided wave radar (GWR) level gauge system utilizing a propagating device in the form of a transmission line probe, such as a single line probe (including a so-called Goubau probe), a two-lead probe, a coaxial probe, etc.

Figure 1:
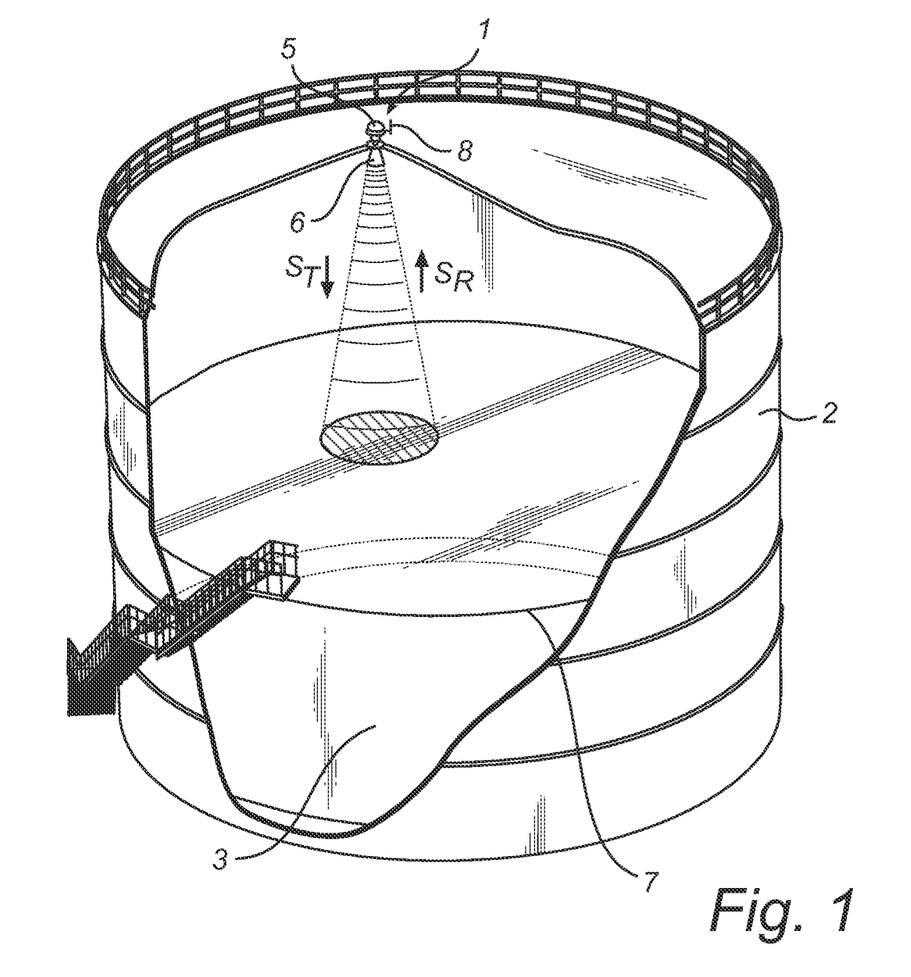
FIG. 1 schematically illustrates a pulsed level gauge system according to an embodiment of the present invention installed in an exemplary tank.

FIG. 1 schematically illustrates a level gauge system 1 arranged on top of a tank 2 for determining the filling level of a product 3 contained in the tank 2 using microwaves. The level gauge system 1 is therefore in the following referred to as a radar level gauge system or an RLG-system.

The radar level gauge system 1 comprises a measurement unit 5, a propagating device, here in the form of a horn antenna 6 for propagating microwaves towards a surface 7 of the product 3 contained in the tank 2, and a communication antenna 8 for allowing wireless communication with a remote device.

When measuring the filling level of the product 3 contained in the tank 2, the radar level gauge system 1 transmits an electromagnetic transmission signal $S_T$ by the antenna 6 towards the surface 7 of the product 3, where the signal is reflected as a surface echo signal $S_R$. The distance between a reference position at the top of the tank 2 and the surface 7 of the product 3 is then determined based on the time-of-flight of the surface echo signal $S_R$ (from the radar level gauge system 1 to the surface 7 and back). From this distance and known dimensions of the tank 2, the filling level can be deduced.

It should be noted that, although a tank 2 containing a single product 3 is discussed herein, the distance to any material interface present in the tank 2 can be measured in a similar manner.

As is schematically illustrated in FIG. 1, the exemplary level gauge system 1 is configured to communicate with external devices, such as a remote control center, using wireless data transmission. For different applications, this may be advantageous, as wiring for communication may often represent a significant part of the cost for installing a level gauge system. A level gauge system configured for wireless communication may often also be required to receive power from a local energy store, such as a battery or similar. To keep the maintenance cost of the level gauge system 1 down, battery life should be as long as possible, preferably in the order of several years, which means that it is important to design the level gauge system 1 for a very low average energy consumption, without compromising the performance of the level gauge system 1 in terms of, for example, accuracy and ability to monitor changes in the tank 2. This is not only of importance for a wireless level gauge system 1, but also for a level gauge system with other restrictions imposed on its supply of electrical power/energy. An example of such a level gauge system is a level gauge system that is powered through the communication lines, such as a so-called two-wire radar level gauge, that communicates and receives electrical energy via a two-wire 4-20 mA current loop.

Figure 2:
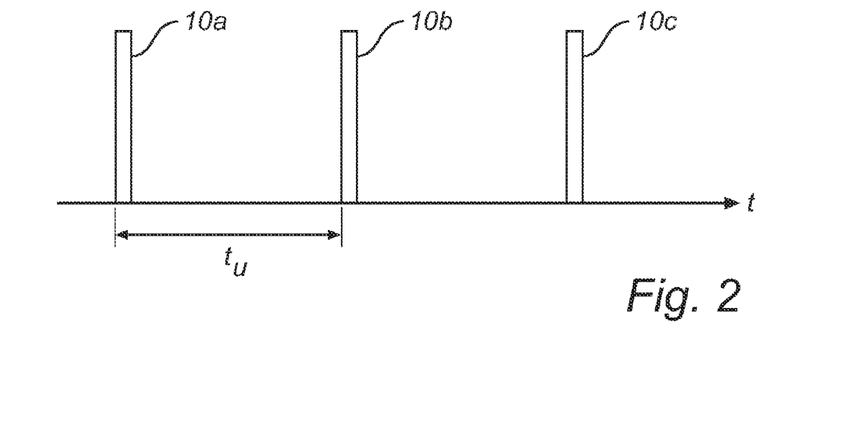
FIG. 2 schematically illustrates a driving scheme for intermittent operation of the level gauge system in FIG. 1.

A widely used scheme for handling situations where the average energy consumption is important is schematically illustrated in FIG. 2. As is indicated in FIG. 2, filling level determination events 10a-c are separated in time, and between these filling level determination events 10a-c, the level gauge system 1 is in a sleep mode, where parts of the level gauge system that are used to determine the filling level may be turned off. This scheme is often referred to as intermittent operation, and the time $t_u$ between the filling level determination events defines an update frequency.

As a further means for reducing the average energy consumption of the level gauge system 1, the various aspects of the present invention provide for adaptive operation of parts of the level gauge system in a low power mode depending on the result of a previous filling level measurement.

This will be described in further detail below with reference to FIGS. 3 to 5.

Figure 3:
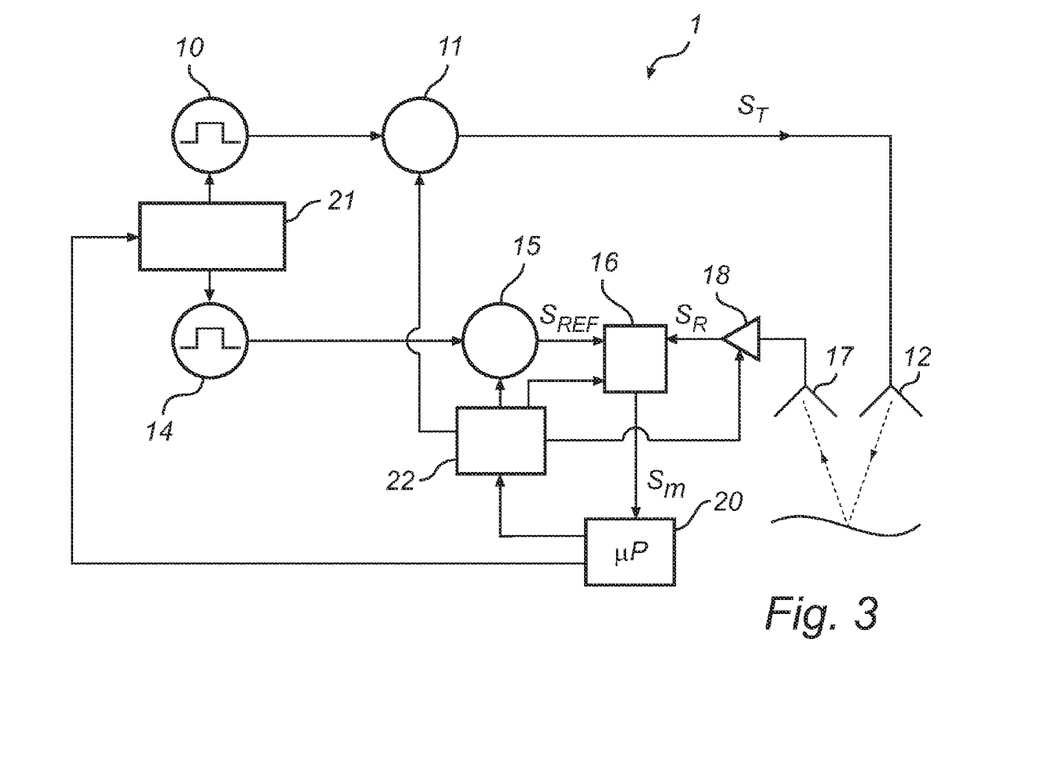
FIG. 3 is a simplified schematic block diagram of the level gauge system in FIG. 1.

FIG. 3 is a block diagram schematically showing functional components comprised in the level gauge system in FIG. 1. The exemplary level gauge system 1 comprises a transmitter branch and a receiver branch.

The transmitter branch comprises transmission signal generating circuitry, here provided in the form of a transmission pulse generator 10 and a first RF-source 11, and a transmitting antenna 12, and the receiver branch comprises reference signal providing circuitry, here provided in the form of a reference pulse generator 14 and a second RF-source 15, measurement circuitry 16, and a receiving antenna 17. The receiver branch further comprises a low noise amplifier 18 for amplifying the signals received by the receiving antenna 17.

In the transmitter branch, the microwaves generated by the first RF-source 11 are modulated by the transmission pulses provided by the transmission pulse generator 10 so that a transmission signal $S_T$ in the form of a sequence of transmission pulses (short "packets" of microwave energy) is formed and is radiated towards the surface 7 of the product by the transmitting antenna 12.

The reflected signal $S_R$ is received by the receiving antenna 17 and is, following amplification in the low noise amplifier 18, forwarded to the measurement circuitry 16. The measurement circuitry 16 is also provided with a reference signal $S_{REF}$, which is formed by the reference pulse generator 14 and the second RF-source 15 as was described above for the generation of the transmission signal $S_T$.

As will be elaborated on further below, the transmission pulse generator 10 and the reference pulse generator 14 generate pulses with slightly different pulse repetition frequencies. The difference frequency $\Delta f$ between the transmission pulse repetition frequency and the reference pulse repetition frequency may be in the order of Hz or tens of Hz.

In the measurement circuitry 16, the reference signal $S_{REF}$ and the reflected signal $S_R$ are time correlated to form a time-expanded measurement signal $S_m$, which is provided to the microprocessor 20, where the distance to the surface 7 of the product 6 is determined based on the measurement signal $S_m$.

The measurement circuitry 16 may, for example, comprise a mixer and a sample-and-hold amplifier, but could also be implemented in other ways known to those skilled in the art. For example, the sample-and-hold amplifier may be configured to achieve time-correlation by controlling the sampling switch using the reference signal $S_{REF}$.

As can be seen in FIG. 3, the level gauge system 1 further comprises timing circuitry 21, which is connected to the microprocessor 20 and to the transmission pulse generator 10 and the reference pulse generator 14, for controlling the timing of the transmission pulse generator 10 and the reference pulse generator 14. As will be discussed further below with reference to FIG. 4, the pulses of the transmission signal $S_T$ and the pulses of the reference signal $S_{REF}$ may advantageously be in phase at the start of a measurement sweep so that the time until there is correlation between the reference signal $S_{REF}$ and the reflected signal $S_R$ together with the difference frequency $\Delta f$ can be used to determine the time-of-flight of the reflected signal $S_R$. The time-of-flight is then used to determine the filling level.

Referring again to FIG. 3, the level gauge system 1 additionally comprises power management circuitry 22 connected to the microprocessor 20, and to various parts of the level gauge system 1 which can be changed to a low-power mode during a portion of the measurement sweep. In the exemplary embodiment that is schematically illustrated in FIG. 3, the power management circuitry 22 is connected to the first RF-source 11, the second RF-source 15, the measurement circuitry 16 and the low noise amplifier 18 between the receiving antenna 17 and the measurement circuitry 16.

Since, for example, these devices in principle need only be fully active at a time corresponding to the time-of-flight of the reflected signal $S_R$, the energy consumption of the level gauge system can be reduced through the use of the power management circuitry 22 for controlling such devices to change from a low-power state to an active state at the start of a reduced time period that comprises a time when the time-varying phase difference provided by the difference frequency $\Delta f$ corresponds to an anticipated filling level, and change back to the low-power state at the end of the reduced time period.

The timing of the transitions between the low-power state and the active state will be described below with reference to FIG. 4, which illustrates a simplified exemplary case.

Figure 4:
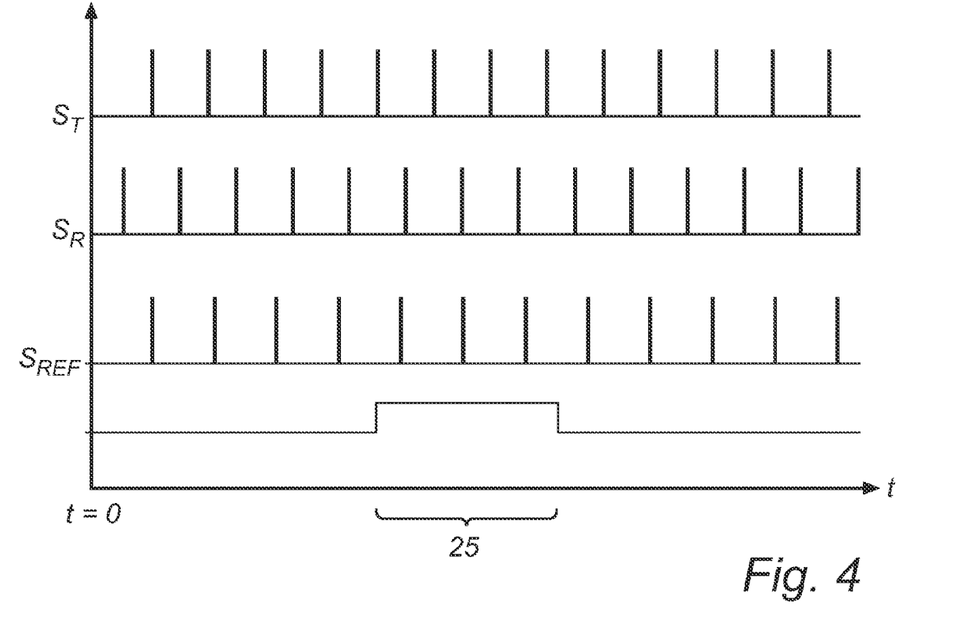
FIG. 4 is a diagram schematically illustrating exemplary timing relations between the different signals involved in the filling level determination by the level gauge system in FIG. 3.

FIG. 4 is a simplified timing diagram schematically showing the relative timing of the transmission signal $S_T$, the reflected signal $S_R$, the reference signal $S_{REF}$ and the transitions between the low-power state and the active state (the high-power state) for the first RF-source 11, the second RF-source 15, the measurement circuitry 16 and the low noise amplifier 18 between the receiving antenna 17 and the measurement circuitry 16.

As is schematically indicated in FIG. 4, the transmission signal $S_T$ and the reference signal $S_{REF}$ are controlled by the timing circuitry 21 to be in phase at the start of the measurement sweep indicated by t=0 in FIG. 3. A full measurement sweep will typically be defined by the difference frequency $\Delta f$, since the transmission signal $S_T$ and the reference signal $S_{REF}$, in this particular example, need to be in phase at the start of a new measurement sweep. As is also schematically indicated in FIG. 4, the reflected signal $S_R$ has the same frequency as the transmitted signal $S_T$, but lags behind the transmitting signal $S_T$ with a time corresponding to the time-of-flight from the transmission antenna 12, via reflection at the surface 7, to the receiving antenna 17 (with the addition of a time lag component being added by the electronics in the level gauge system 1).

The reference signal $S_{REF}$ is initially in phase with the transmission signal, but will, due to its lower pulse repetition frequency "run away from" the transmission signal $S_T$ and "catch up with" the reflected signal $S_R$. When the time-varying phase difference between the transmission signal $S_T$ and the reference signal $S_{REF}$ corresponds to the time-of-flight of the reflected signal $S_R$, there will be a correlation between one (or a few) pulse(s) of the reference signal and one (or a few) pulse(s) of the reflected signal.

Based on the one or several previous filling level measurements, the time from the start of the measurement sweep (t=0) until the time when the time-varying phase difference between the transmission signal $S_T$ and the reference signal $S_{REF}$ corresponds to the time-of-flight of the reflected signal $S_R$ can be estimated. This estimation is used to determine a reduced time period 25, during which the first RF-source 11, the second RF-source 15, the measurement circuitry 16 and the low noise amplifier 18 between the receiving antenna 17 and the measurement circuitry 16, are controlled by the power management circuitry 22 to be active, as is schematically indicated in the bottom graph in FIG. 4.

It should be noted that the present inventions is equally applicable to pulsed level gauge systems in which the time-varying phase difference is achieved by providing the reference signal as the transmission signal being delayed by a time varying delay, or vice-versa.

Moreover, for so-called guided wave radar (GWR), the pulses $S_{PRF}$ generated by the transmission pulse generator 10 could be propagated directly towards the surface using a transmission line probe, i.e. without modulating an RF-signal. Such an GWR-system may thus function without the first 11 and second 15 RF-sources indicated in FIG. 3.

An embodiment of the method according to the present invention will now be described with reference to the flow chart in FIG. 5, and to FIGS. 3 and 4.

Figure 5:
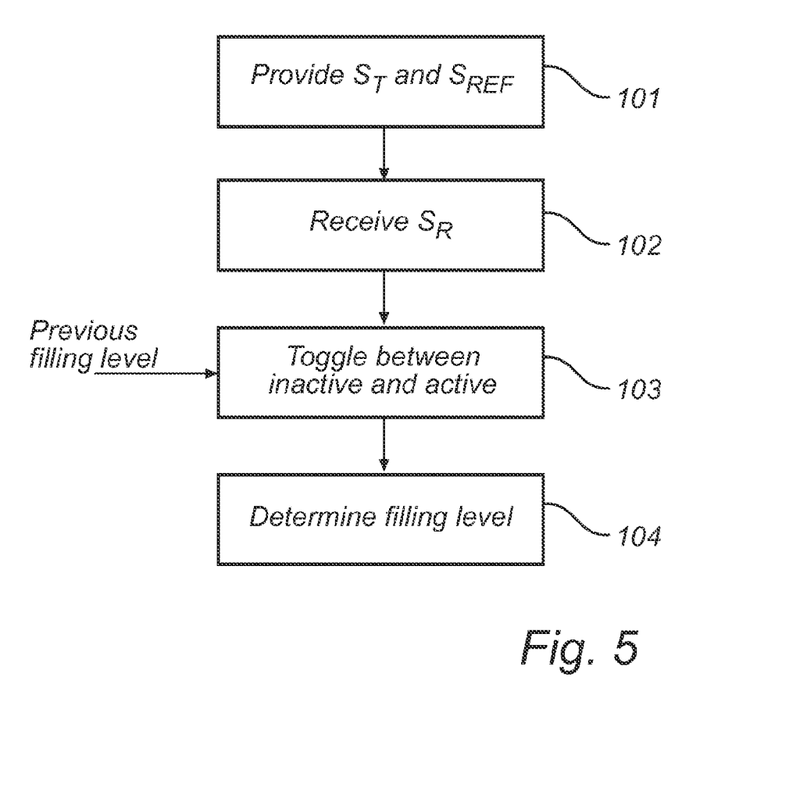
FIG. 5 is a flow chart schematically illustrating an embodiment of the method according to the present invention.

Referring to FIG. 5, the transmission signal $S_T$ and the reference signal $S_{REF}$ are provided in a first step 101. The transmission signal $S_T$ is transmitted towards the surface 7 of the product 3 contained in the tank 2, and a reflected signal $S_R$ resulting from reflection of the transmission signal $S_T$ at the surface 7 is received in step 102.

In the subsequent step 103, parts of the level gauge system 1 are changed by the power management circuitry 22 from a low power state to an active state at the start of a reduced time period 25, and thereafter changed back to the low power state at the end of the reduced time period. The reduced time period is determined based on previous filling level measurements and is selected to include a time at which a time-varying phase difference between the transmission signal $S_T$ and the reference signal corresponds to a time-of-flight of the reflected signal $S_R$.

Finally, in step 104, the filling level is determined by the microprocessor 20 based on the measurement signal $S_m$ formed by the measurement circuitry 16.

It is noted that the invention has mainly been described above with reference to a few embodiments. However, as is readily appreciated by a person skilled in the art, other embodiments than the ones disclosed above are equally possible within the scope of the invention, as defined by the appended claims.

It is further noted that, in the claims, the word "comprising" does not exclude other elements or steps, and the indefinite article "a" or "an" does not exclude a plurality. A single apparatus or other unit may fulfill the functions of several items recited in the claims. The mere fact that certain measures are recited in mutually different dependent claims does not indicate that a combination of these measured cannot be used to advantage.

What is claimed is:

1. A level gauge system, for determination of a filling level of a product contained in a tank using electromagnetic signals, said level gauge system comprising:
    transmission signal generating circuitry for generating an electromagnetic transmission signal in the form of a sequence of transmit pulses;

a propagation device connected to said transmission signal generating circuitry and arranged to propagate said electromagnetic transmission signal towards a surface of said product inside the tank, and to return a reflected electromagnetic signal resulting from reflection of said electromagnetic transmission signal at said surface of the product contained in the tank;

reference signal providing circuitry configured to provide an electromagnetic reference signal in the form of a sequence of reference pulses;

timing circuitry connected to at least one of the transmission signal generating circuitry and the reference signal providing circuitry for providing a time-varying phase difference between the electromagnetic transmission signal and the electromagnetic reference signal, said time-varying phase difference varying between a phase difference corresponding to a minimum measurement distance and a phase difference corresponding to a maximum measurement distance during a measurement sweep time period;

measurement circuitry connected to said propagation device and to said reference signal providing circuitry, said measurement circuitry being configured to provide a measurement signal based on said electromagnetic reference signal and said reflected electromagnetic signal;

processing circuitry connected to said measurement circuitry for determining a filling level based on said measurement signal; and power management circuitry connected to at least one of said transmission signal generating circuitry and said reference signal providing circuitry, and configured to control at least one of said said transmission signal generating circuitry and said reference signal providing circuitry to change from a low-power state to a high-power state at a start of a reduced time period comprising a time when said time-varying phase difference corresponds to an anticipated filling level and to change back from said high-power state to said low-power state at an end of said reduced time period, said reduced time period being shorter than said measurement sweep time period.

2. The level gauge system according to claim 1, wherein said reduced time period is less than one half of said measurement sweep time period.

3. The level gauge system according to claim 1, wherein said reduced time period is determined based on a previously determined filling level.

4. The level gauge system according to claim 3, wherein said reduced time period is further determined based on a signal from an auxiliary system indicating a change in said filling level.

5. The level gauge system according to claim 3, wherein said reduced time period is determined based on a variation among a plurality of previous filling level determinations.

6. The level gauge system according to claim 5, wherein said reduced time period is determined based on a rate of change of the filling level.

7. The level gauge system according to claim 1, wherein said power management circuitry is configured to control at least one of said transmission signal generating circuitry and said reference signal providing circuitry to change from said low-power state to said high-power state at a start of at least one additional reduced time period comprising a time when said time-varying phase difference corresponds to a previously identified further echo signal and to change back from said high-power state to said low-power state at an end of said additional reduced time period.

8. The level gauge system according to claim 1, wherein said level gauge system is configured to periodically perform a measurement across a full measurement sweep defined by said measurement sweep time period.

9. The level gauge system according to claim 1, wherein:
at least one of said transmission signal generating circuitry and said reference signal providing circuitry comprises an amplifier; and
said power management circuitry is configured to provide a signal for enabling said amplifier in the high-power state and to provide a signal for disabling said amplifier in the low-power state.

10. The level gauge system according to claim 1, wherein:
at least one of said transmission signal generating circuitry and said reference signal providing circuitry comprises a pulse generator and a microwave signal source arranged to be modulated by an output of said pulse generator; and
said power management circuitry is configured to provide a signal for enabling said microwave signal source in the high-power state and to provide a signal for disabling said microwave signal source in the low-power state.

11. The level gauge system according to claim 1, wherein said power management circuitry is further connected to the measurement circuitry and configured to control the measurement circuitry to change from a low-power state to a high-power state at the start of said reduced time period and to change back from said high-power state to said low-power state at the end of said reduced time period.

12. The level gauge system according to claim 1, wherein said level gauge system further comprises a local energy store for providing electrical energy for operation of said level gauge system.

13. A method of determining a filling level of a product contained in a tank using electromagnetic signals, said method comprising the steps of:
generating an electromagnetic transmission signal in the form of a sequence of transmit pulses;
propagating said electromagnetic transmission signal towards a surface of said product contained in the tank;
receiving a reflected electromagnetic signal resulting from reflection of said electromagnetic transmission signal at said surface of said product;
providing an electromagnetic reference signal in the form of a sequence of reference pulses exhibiting a time-varying phase difference in relation to said transmission signal, said time-varying phase difference varying between a phase difference corresponding to a minimum measurement distance and a phase difference corresponding to a maximum measurement distance during a measurement sweep time period;
forming a measurement signal based on said electromagnetic reference signal and said reflected electromagnetic signal; and
determining said filling level based on said measurement signal,
wherein said method further comprises the steps of:
determining a reduced time period comprising a time when said time-varying phase difference corresponds to an anticipated filling level, said reduced time period being shorter than said measurement sweep time period;
controlling said level gauge system to change from a low-power state in which an amplifier for amplifying said reflected electromagnetic signal is disabled to a high-power state in which said amplifier for amplifying said reflected electromagnetic signal is enabled at a start of said reduced time period; and controlling said level gauge system to change back from said high-power state to said low-power state at an end of said reduced time period.

14. The method according to claim 13, wherein said reduced time period is determined based on a previous filling level determination.

15. The method according to claim 13, wherein said reduced time period is less than one half of said measurement sweep time period.

* * * * *